United States Patent [19]
Armstrong

[11] Patent Number: 5,288,050
[45] Date of Patent: Feb. 22, 1994

[54] DISPLAY DEVICE

[76] Inventor: Richard L. Armstrong, 23 S. Turkey Hill Rd., Westport, Conn. 06880

[21] Appl. No.: 802,484

[22] Filed: Dec. 5, 1991

Related U.S. Application Data

[63] Continuation of Ser. No. 500,692, Mar. 28, 1990, abandoned.

[51] Int. Cl.$^5$ .............................................. F16M 13/00
[52] U.S. Cl. .................................... 248/479; 248/447; 248/453; 248/289.1
[58] Field of Search .................... 248/479, 447, 441.1, 248/289.1, 442.2, 447.1, 447.2, 450, 451, 453, 458; 40/492, 607, 533

[56] References Cited
U.S. PATENT DOCUMENTS

| | | | |
|---|---|---|---|
| 1,444,077 | 2/1923 | Koehn | 248/289.1 X |
| 1,475,025 | 11/1923 | Newman et al. | 248/289.1 X |
| 1,865,863 | 7/1932 | Kraft | 40/533 |
| 4,960,257 | 10/1990 | Waters | 248/442.2 |

Primary Examiner—Alvin C. Chin-Shue

[57] ABSTRACT

A display device or easel includes a display member with first and second parallel face surfaces facing in opposite directions away from each other. The device also includes structure for mounting the display member including the panel for pivotal movement with respect to a vertical surface about a vertical axis, between a first extreme position in which the first face surface faces in a first direction and the second face surface faces in a second direction that is opposite the first direction and a extreme second position in which the first face surface faces in the second direction and the second face surface faces in the first direction.

21 Claims, 2 Drawing Sheets

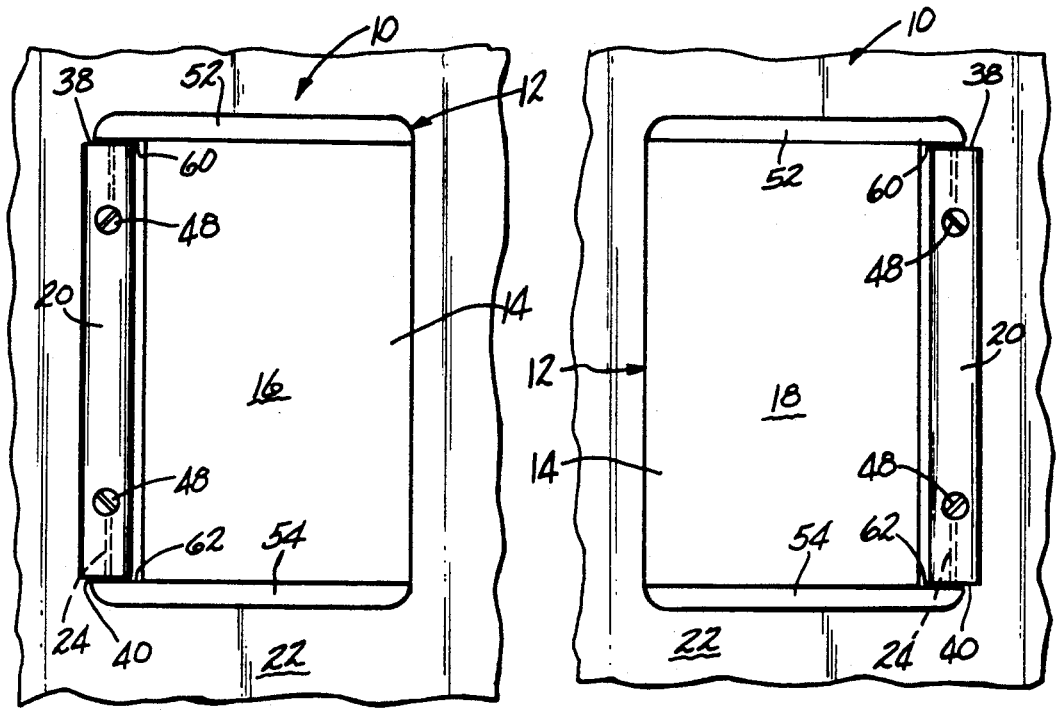
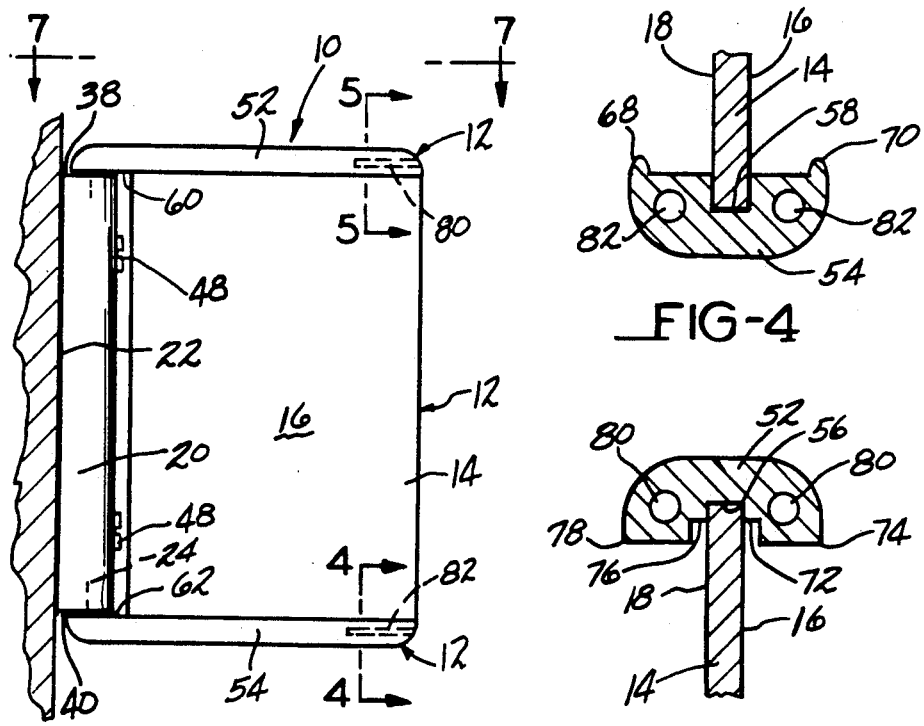

DISPLAY DEVICE

This is a continuation of application Ser. No. 500,692, filed Mar. 28, 1990, abandoned.

BACKGROUND OF THE INVENTION

This invention relates to a display device or easel and more particularly to such a device that is wall mountable with first and second oppositely facing faces that can be deployed at any of a plurality of angles, including an angle at which the first face faces away from the wall and the second face faces toward the wall and another angle at which the second face faces away from the wall and the first face faces toward the wall.

The following U.S. Patents may be of interest to the reader as background prior art, but none seems to be germane to the present invention:

| U.S. Pat. No. | Date | Inventor |
| --- | --- | --- |
| 2,339,447 | January 18, 1944 | Zwickel |
| 2,913,123 | November 17, 1959 | Lundberg |
| 3,207,319 | September 21, 1965 | Best |
| 3,603,556 | September 7, 1971 | Frantz |
| 4,456,286 | June 26, 1984 | Jamar |
| 4,693,443 | September 15, 1987 | Drain |

Zwickel U.S. Pat. No. 2,339,447 relates to filing equipment with multiple pivotable closely spaced suspension arms, and is concerned primarily with overcoming difficulties encountered in locating, grasping and withdrawing a desired suspension arm from the remainder of the equipment. A manually actuated means automatically effects selective projection of the desired suspension arm.

Lundberg U.S. Pat. No. 2,913,123 presents a quite complex hanger for drawings.

Best U.S. Pat. No. 3,207,319 discloses a display rack for sheet type articles, particularly rugs.

Frantz U.S. Pat. No. 3,603,556 teaches a pivoted member assembly and has as its primary object the provision of a device in which the pivoted member is held by friction in a selected position despite vibrations to which its mounting is exposed.

Jamar U.S. Pat. No. 4,456,286 provides a presentation board or easel that is used to hold pads of paper, posters, cards and the like.

Drain U.S. Pat. No. 4,693,443 discloses an apparatus for removably retaining sheet material. A holder frictionally secures the sheet material intermediate a back plate and a plurality of rollers.

Presently, easels are designed as free standing tripods and four-legged stands upon which large pads are hung, for presentation purposes. Pages are flipped over the top in order to expose the underpages. In some models, the easel can be used as a writing board when the pads are not in place. Generally the easel folds up for transporting or storage when not in use. When portability is not desired, fixed wall mounted writing surfaces are available. While these conserve floor space they do not accommodate easel pads since the pages cannot be flipped over the top. The more elaborate wall mounted models are constructed with cover doors which close, to conceal the writing surface when not in use. The instant wall mounted easel is a unit which attaches to the wall vertically. An arm is connected to the vertical stabilizer that pivots 180 degrees. The arm has pins or clips attached that enables the easel pad to be mounted on either side of the arm. There are (5) locking positions to facilitate multiple angle viewing positions. When positioned against the wall or in one of the locked angle positions, the charts or writing surface can be written upon. When positioned against the wall the arm is temporarily moved away from the wall to flip the pages. If confidentiality of the viewing or writing surface is desired the arm is rotated to place that surface to abut the wall. The arm is removable for transporting to other work areas.

Each face of the unit is a replica of the other presenting two writing surfaces and flip charts mounting capability doubling its functionality over existing presentation devices.

Generally, easels are clumsy and space consuming. As such they are cost prohibitive for multiple offices and single units are often shared. The wall mounted easel can cost effectively be manufactured and distributed. Several models would be available with materials of construction ranging from low cost fabricated metal or plastic frames to fine woods and the like. Prior art devices are subject to a variety disadvantages that dilute their effectiveness. Floor easels are bulky and space consuming. Wall presentation boards are not portable, do not accept easel pads because pages cannot be flipped over the top, and they have only one viewing plane and writing surface which are difficult to conceal. Wall presentation cabinets offer concealment but usually have only one writing surface, one viewing plane, do not accept flip charts, are not portable and are costly.

Important objects of the invention are to provide a display device having all of the foregoing advantages and none of the prior art disadvantages. The foregoing and other objects and advantages of the invention will appear hereinafter.

SUMMARY OF THE INVENTION

A display device or easel embodying the invention comprises a display member that includes a panel having first and second parallel face surfaces facing in opposite directions away from each other. The device also includes means for mounting the panel for pivotal movement with respect to a vertical surface about a vertical axis, between a first extreme position in which the first face surface faces in a first direction and the second face surface faces in a second direction that is opposite the first direction and a second extreme position in which the first face surface faces in the second direction and the second face surface faces in the first direction. With the display member so mounted by the mounting means, when the display member is in the first extreme position only the first face surface is observable and when the display member is in the second extreme position only the second face surface is observable.

The display device further comprises impositive means for selectively holding the display member in the first extreme position or the second extreme position or in at least a first intermediate position between the first and second extreme positions, and preferably a plurality of such intermediate positions. The first intermediate position is halfway between the first and second extreme positions.

The first and second face surfaces may be provided by material that is capable of receiving erasable or otherwise removable indicia thereon. Examples of such material are slate, porcelain, melamine, cork and fabric.

The mounting means includes a mounting member having upper and lower configurations defining the vertical axis and affixable to a vertical surface.

The display member includes upper and lower support arms holding the panel therebetween and having confronting portions extending beyond a side edge of the panel and having upper and lower aligned configurations in pivotable interengagement with the upper and lower configurations, respectively, of the mounting member. The interengagement is releasable, whereby the display member is removable from the mounting member. The first and second face surfaces are rectangular, and are preferably at least 27 inches (67.6 cm) in horizontal dimension and 34 inches (86.4 cm) in vertical dimension, to accept standard pads of those dimensions.

The mounting member and the upper and lower support arms are preferably constructed of decorative materials, such as fabricated metals, plastic or fine woods and the like.

The lower support arm is disclosed as providing a tray on opposite sides of the first and second face surfaces.

The upper support arm has means for holding a pad on either of the first and second face surfaces, and the upper support arm provides a first notch adjacent the first face surface for receiving a top of a first pad and a first tearing edge for tearing sheets from the first pad and the upper support arm also provides a second notch adjacent the second face surface for receiving a top of a second pad and a second tearing edge for tearing sheets from the second pad.

The upper support arm or the lower support arm, or both, may be provided with openings for storing one or more writing implements.

The display device may further comprise known but not shown clip or pin means for holding a pad against the first face surface or the second face surface. Means for mounting the display on a partition is also disclosed.

The display device may be equipped with an opaque decorative panel and means for releasably securing the decorative panel in obscuring covering relationship with either selected one of the first and second face surfaces.

DESCRIPTION OF THE DRAWING

FIG. 1 is an elevation of a preferred display device attached to a vertical surface and including a panel shown in a first position;

FIG. 2 is a view similar to FIG. 1 but showing the panel in a second position;

FIG. 3 is a view similar to FIGS. 1 and 2 but showing the panel in an intermediate position that is half way between the first and second positions;

FIG. 4 is an enlarged sectional view taken on line 4—4 of FIG. 3;

FIG. 5 is an enlarged sectional view taken on line 5—5 of FIG. 3;

DESCRIPTION OF THE INVENTION

Figure 6:
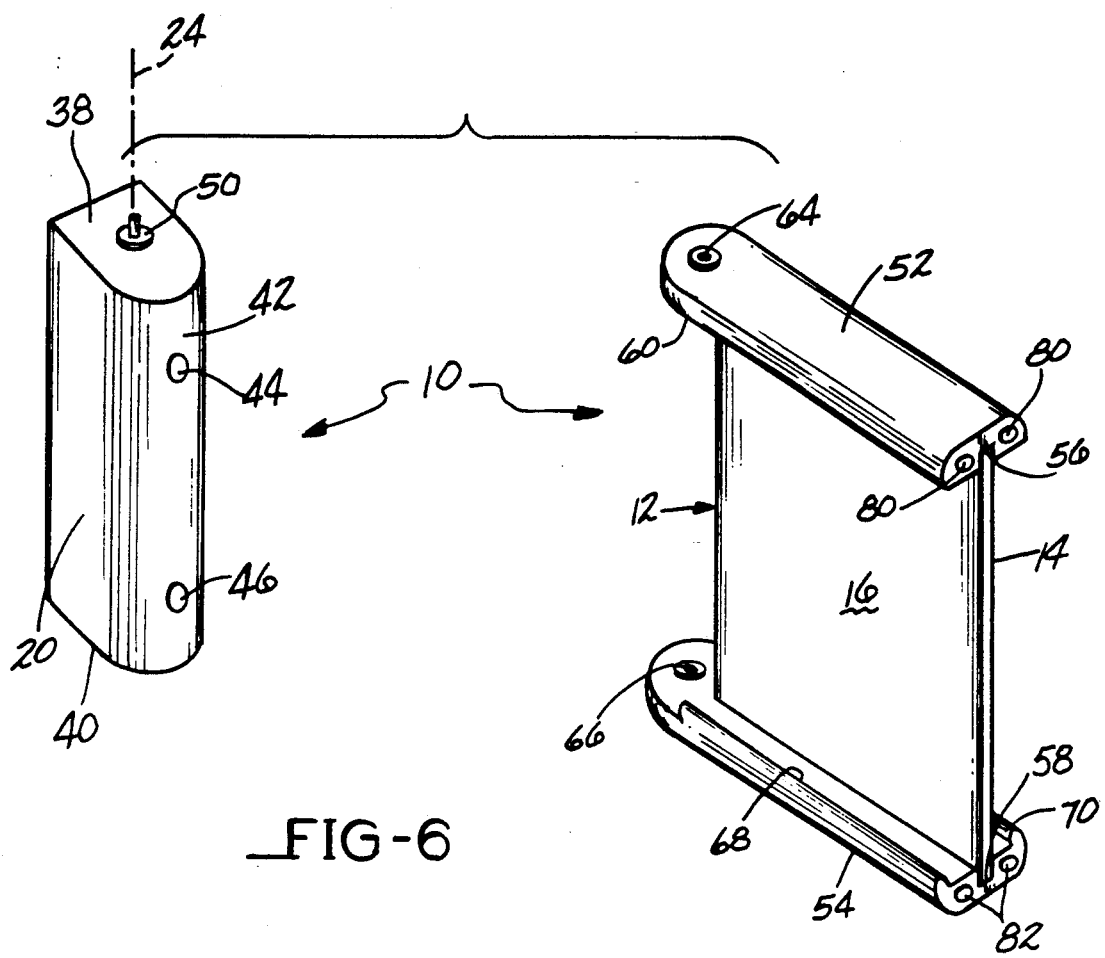
FIG. 6 is an exploded perspective view of the preferred display device.
Figure 7:
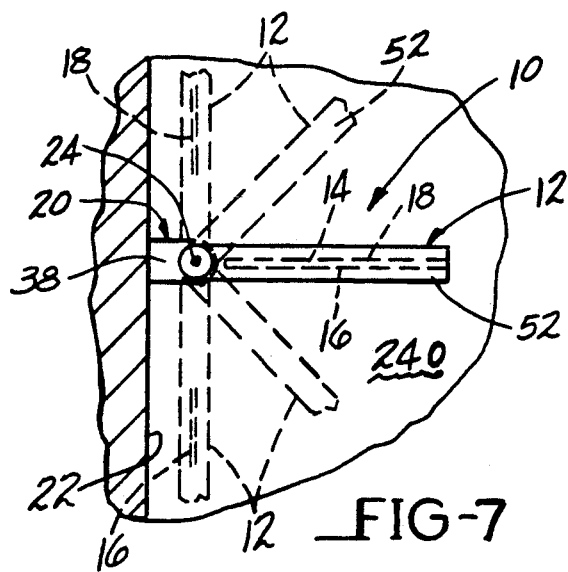
FIG. 7 is a fragmentary view on line 7—7 of FIG. 3, showing the display member in the first intermediate position of FIG. 3 and in phantom in the first position of FIG. 1, the second position of FIG. 2, and two additional intermediate positions.

FIGS. 1-3, 6 and 7 show a display device or easel 10 that is a preferred embodiment of the invention. Display device 10 comprises a display member 12 that includes a rectangular panel 14 having first and second plane parallel face surfaces 16 and 18, respectively, facing in opposite directions away from each other. Display device 10 also comprises mounting means, illustrated as a mounting member 20 for mounting display member 12, including panel 14, for pivotal movement with respect to a vertical surface 22, about a vertical axis 24. Vertical surface 22 may be a wall or a partition perpendicular to a floor 26 (FIG. 7).

The extent of the pivotal movement of display member 14 with respect to vertical surface 22 is about 180 degrees and is between a first extreme position shown in FIG. 1 and a second extreme position shown in FIG. 2. In the first extreme position, first face surface 16 faces in a first direction and second face surface 18 faces in a second direction that is opposite the first direction, whereas in the second extreme position, first face surface 16 faces in the second direction and second face surface 18 faces in the first direction. The first direction is the direction facing away from vertical surface 22 and the second direction is the direction facing vertical surface 22. Thus, when display member 12 is in its first position first face surface 16 is observable and second face surface 18 confronts vertical surface 22 and is not observable, whereas when display member 12 is in its second position second face surface 18 is observable and first face surface 16 confronts vertical surface 22 and is not observable.

Device 10 further comprises means for selectively holding display member 12 in the first extreme position or the second extreme position, or in at least a first intermediate position halfway between the first and second positions, and, preferably a plurality of such intermediate positions. Preferably and as illustrated, the holding means is impositive such as a known but not shown bullet catch comprising a spring loaded ball mounted upwardly in the top of lower arm 54 so as to interlock with semi-spherical recesses in mounting member 20 at lower end 40 as shown in FIG. 3.

Display member 12 is shown in the first intermediate position in FIG. 3 and also in full lines in FIG. 7. When display member 12 is in the first intermediate position, both faces 16 and 18 are observable. FIG. 7 also shows display member 12 in phantom in the first extreme position in which display member 12 is parallel to vertical surface 22 with face surface 18 confronting same, the second extreme position in which display member 12 is parallel to vertical surface 22 with face surface 16 confronting same, in a second intermediate position midway between the first extreme position and the first additional position and in a third intermediate position midway between the second extreme position and the first intermediate position. When in the second and third intermediate positions, more or less of face surfaces 16 and 18 are observable. It is noted that the various extreme and intermediate positions are evenly spaced from one another, the angle between adjacent ones of the positions being about 45 degrees.

Face surfaces 16 and 18 are preferably provided by material that is capable of receiving erasable or otherwise removable indicia thereon. Examples of such material include slate, porcelain, melamine, cork and fabric.

Mounting member 20 has an upper end 38, a lower end 40 and a curved front portion 42 with spaced mounting holes 44 and 46 (FIG. 6), whereby mounting member 20 can be secured to vertical surface 22 by screws 48 (FIGS. 1, 2 and 3). Mounting member 20 has upper and lower configurations provided by aligned pins 50 protruding from upper end 38 and lower end 40. That pin 50 which protrudes from upper end 38 can be seen in FIG. 6, but that pin 50 which protrudes from lower end 40 does not appear, it being noted that mounting member 20 is reversible as to its upper and lower ends 38 and 40. Pins 50 define axis 24, which, when mounting member 20 is properly affixed to vertical surface 22, is vertical. Display member 12 includes, in addition to panel 14, upper and lower support arms 52 and 54, respectively, both arms 52 and 54 being shown in FIGS. 1-3 and 6. Upper arm 52 also appears in FIGS. 5 and 7 and lower arm 54 in FIG. 4. Arms 52 and 54 hold panel 14 therebetween in grooves 56 and 58, respectively, as indicated particularly in FIGS. 4 and 5.

Arms 52 and 54 have confronting portions 60 and 62, respectively, extending beyond a side edge of panel 14. Portions 60 and 62 have upper and lower aligned configurations provided by bushings 64 and 66, respectively, with confronting aligned holes sized and spaced to receive pins 50 therein, with bushing 64 receiving upper pin 50 as seen in FIG. 6. Lower bushing 6 is spring loaded in a known but not shown manner whereby bushings 64 and 66 are releasably interengageable with pins 50, whereby display member 12 is readily removable from and replaceable in interengagement with mounting member 20.

As stated, face surfaces 16 and 18 are rectangular. They are preferably at least 27 inches (67.6 cm) in horizontal dimension and 34 inches (86.4 cm) in vertical dimension, to accept thereon pads of those dimensions. Mounting member 20 and upper and lower support arms 52 and 54 are preferably fabricated of decorative material, such as fabricated metal, plastic and wood.

Lower support arm 54 has upturned longitudinal edges 68 and 70 on opposite sides of panel 14, as shown in FIGS. 4 and 6, providing a tray on opposite sides of face surfaces 16 and 18.

As best seen in FIG. 5, upper support arm 52 has means for holding a pad (not shown) on either of face surfaces 16 and 18. To that end, upper support arm 52 has a configuration providing a first notch 72 adjacent face surface 16 for receiving a top of a first pad and a first tearing edge 74 for tearing sheets from the first pad. Upper support arm 72 also has a configuration providing a second notch 76 adjacent face surface 18 for receiving a top of a second pad and a second tearing edge 78 for tearing sheets from the second pad.

Upper support arm 52 and lower support arm 54 are shown as having cylindrical openings 80 and 82, respectively, in open communication with the ends of arms 52 and 54, respectively, remote from bushings 64 and 66, for storing one or more writing implements.

Display device 10 may further comprise clip means for holding a pad against face surface 16 or 18, and means for mounting display member 12 on a partition. Display device 10 is disclosed as further comprising an opaque decorative panel and means for releasably securing same in covering relationship with either selected one of face surfaces 16 and 18, whereby when and if desired, material thereon can be quickly, effectively and attractively obscured from view.

Also, the edge of panel 14 and the ends of arms 52 and 54 remote from the axis of display member 12 are preferably capped. Furthermore, if desired, the edge of panel 14 adjacent the axis of member 12 may also be capped, to provide a frame-like structure surrounding panel 14.

It is evident that the invention achieves the foregoing objects and advantages and others.

The disclosed details are exemplary only and are not to be taken as limitations on the invention except as those details may be included in the appended claims.

What is claimed is:

1. A display device comprising a display member including a rigid panel having first and second parallel faces facing in opposite directions away from each other and upper and lower parallel end surfaces spaced apart a fixed distance, said device also including means for mounting said display member including said panel for pivotal movement with respect to a vertical surface between a first extreme position in which said first face surface faces in a first direction and said second face surface faces in a second direction that is opposite said first direction and a second extreme position in which said first face surface faces in said second direction and said second face surface faces in said first direction, wherein said mounting means includes a mounting member having upper and lower configurations defining an axis and affixable to a vertical surface with said axis vertical, and said display member includes upper and lower support arms spaced a fixed distance apart and engaging said upper and lower end surfaces of said panel to hole said panel between said support arms, said arms having confronting ends extending beyond a side edge of said panel and having upper and lower aligned configurations in pivotal interengagement with said upper and lower configurations, respectively, of said mounting member, and wherein said lower support arm provides first and second trays on opposite sides of said first and second face surfaces.

2. A display device according to claim 1 wherein, with said display member mounted by said mounting means for pivotal movement about a vertical axis with respect to a vertical surface, when said display member is in said first extreme position said first face surface is observable and when said panel is in said second extreme position said second face surface is observable.

3. A display device according to claim 1 further comprising means for selectively holding said display member in a desired one of said first and second extreme positions.

4. A display device according to claim 3 wherein said holding means is impositive.

5. A display device according to claim 1 further comprising means for selectively holding said display member in any desired one of said first extreme position, said second extreme position and at least a first intermediate position between said first extreme position and said second extreme position.

6. A display device according to claim 5 wherein said holding means is impositive.

7. A display device according to claim 5 wherein in said first intermediate position said display member is halfway between said first extreme position and said second extreme position and both said face surfaces are observable.

8. A display device according to claim 7 wherein said holding means is impositive.

9. A display device according to claim 1 further comprising means for selectively holding said display member in any desired one of said first extreme position, said second extreme position and a plurality of intermediate positions between said first extreme position and said second extreme position, said positions being equally spaced from each other.

10. A display device according to claim 9 wherein said holding means is impositive.

11. A display device according to claim 1 wherein said first and second face surfaces are provided by material that is capable of receiving removable indicia thereon.

12. A display device according to claim 11 wherein said material is selected from a group of materials consisting of slate, porcelain, melamine, cork and fabric.

13. A display device according to claim 1 wherein said interengagement is releasable whereby said display member is removable from said mounting member.

14. A display device according to claim 1 wherein said first and second face surfaces are rectangular.

15. A display device according to claim 14 wherein said first and second rectangular face surfaces are at least 27 inches (67.6 cm) in horizontal dimension and 34 inches (86.4 cm) in vertical dimension, to accept standard pads of those dimensions.

16. A display device according to claim 1 wherein said mounting member and said upper and lower support arms are fabricated of decorative material.

17. A display device according to claim 16 wherein said decorative material is selected from a group of materials consisting of fabricated metal, plastic and wood.

18. A display device according to claim 1 wherein said upper support arm has means for holding a pad on either of said first and second face surfaces.

19. A display device according to claim 18 herein said upper support arm provides a first notch adjacent said first face surface for receiving a top of a first pad and a first tearing edge for tearing sheets from the first pad and said upper support arm provides a second notch adjacent said second face surface for receiving a top of a second pad and a second tearing edge for tearing sheets from the second pad.

20. A display device according to claim 1 wherein one said support arm has therein a longitudinal opening in open communication with one of its ends for storing a writing implement.

21. A display device comprising a display member including a panel having first and second parallel face surfaces facing in opposite directions away from each other, and said device also including means for mounting said display member including said panel for pivotal movement with respect to a vertical surface about a vertical axis, between a first extreme position in which said first face surface faces in a first direction and said second face surface faces in a second direction that is opposite said first direction and a second extreme position in which said first face surface faces in said second direction and said second face surface faces in said first direction.

* * * * *

UNITED STATES PATENT AND TRADEMARK OFFICE
CERTIFICATE OF CORRECTION

PATENT NO. : 5,288,050

DATED : February 22, 1994

INVENTOR(S) : Richard L. Armstrong

It is certified that error appears in the above-indentified patent and that said Letters Patent is hereby corrected as shown below:

Column 4, line 7, for "24" should read --240--.

Column 8, lines 16-28, (claim 21) should read as follows:
--21. A display device comprising a display member including a single rigid panel having first and second parallel opaque face surfaces facing in opposite directions away from each other and upper and lower parallel surfaces spaced apart a fixed distance, and said device also including means for mounting said display member including said panel for pivotal movement with respect to a vertical surface with said first and second face surfaces vertical between a first extreme position in which said first face surface faces in a first horizontal direction and said second face surface faces in a second horizontal direction that is opposite said first direction and a second extreme position in which said first face surface faces in said second direction and said secind face surface faces in said first direction, wherein said mounting means includes a single one piece mounting member having upper and lower aligned configurations defining a first pivotal axis for said panel, said first axis being parallel to said face surfaces and said mounting member having a rear surface affixable to a vertical surface with said first axis and said face

UNITED STATES PATENT AND TRADEMARK OFFICE
CERTIFICATE OF CORRECTION

PATENT NO. : 5,288,050

DATED : February 22, 1994

INVENTOR(S) : Richard L. Armstrong

It is certified that error appears in the above-indentified patent and that said Letters Patent is hereby corrected as shown below:

surfaces vertical and a convexly curved front surface substantially coaxial with said first axis, and said display member includes upper and lower straight and parallel support arms spaced a fixed and constant distance apart and engaging said upper and lower surfaces of said panel to hold said panel between said support arms, said arms having confronting ends extending beyond a side edge of said panel and having upper and lower aligned configurations in pivotal interengagement with said upper and lower aligned configurations, respectively, of said mounting member, said pivotal interengagement rendering said display member rotatable about a second pivotal axis that coincides with said first pivotal axis.- -.

Signed and Sealed this

Twenty-seventh Day of September, 1994

Attest:

BRUCE LEHMAN

*Attesting Officer*   *Commissioner of Patents and Trademarks*